United States Patent
Bigioi et al.

(10) Patent No.: US 9,053,681 B2
(45) Date of Patent: Jun. 9, 2015

(54) REAL-TIME VIDEO FRAME PRE-PROCESSING HARDWARE

(75) Inventors: Petronel Bigioi, Galway (IE); Corneliu Zaharia, Bucharest (RO); Peter Corcoran, Claregalway (IE)

(73) Assignee: FotoNation Limited, Ballybrit, Galway (IE)

( * ) Notice: Subject to any disclaimer, the term of this patent is extended or adjusted under 35 U.S.C. 154(b) by 882 days.

(21) Appl. No.: 12/959,281

(22) Filed: Dec. 2, 2010

(65) Prior Publication Data

US 2012/0008002 A1     Jan. 12, 2012

Related U.S. Application Data

(60) Provisional application No. 61/362,247, filed on Jul. 7, 2010.

(51) Int. Cl.
| | |
|---|---|
| *G06T 1/20* | (2006.01) |
| *G06T 7/00* | (2006.01) |
| *G09G 5/393* | (2006.01) |
| *G06T 1/00* | (2006.01) |
| *H04N 5/232* | (2006.01) |
| *H04N 5/335* | (2011.01) |
| *H04N 9/67* | (2006.01) |
| *G06T 1/60* | (2006.01) |
| *G06F 15/80* | (2006.01) |

(52) U.S. Cl.
CPC ............ *G09G 5/393* (2013.01); *G06F 15/8046* (2013.01); *G06T 1/0007* (2013.01); *G06T 1/20* (2013.01); *H04N 5/23229* (2013.01); *H04N 5/335* (2013.01); *H04N 9/67* (2013.01); *G06T 1/60* (2013.01); *G09G 2360/12* (2013.01)

(58) Field of Classification Search
None
See application file for complete search history.

(56) References Cited

U.S. PATENT DOCUMENTS

| | | | | |
|---|---|---|---|---|
| 5,138,695 | A | * | 8/1992 | Means et al. ............... 706/41 |
| 5,406,642 | A | | 4/1995 | Maruya |
| 5,481,669 | A | | 1/1996 | Poulton et al. |
| 6,298,170 | B1 | | 10/2001 | Morita et al. |
| 7,016,881 | B2 | | 3/2006 | Li et al. |
| 7,324,671 | B2 | | 1/2008 | Li et al. |
| 8,184,696 | B1 | * | 5/2012 | Chirila-Rus et al. ..... 375/240.12 |

(Continued)

FOREIGN PATENT DOCUMENTS

| | | |
|---|---|---|
| EP | 1205881 A2 | 5/2002 |
| EP | 1107177 B1 | 10/2009 |

(Continued)

OTHER PUBLICATIONS

Saldana et al. "Real Time FPGA-based Architecture for Video Applications." IEEE Conference on Reconfigurable Computing and FPGA's, Sep. 2006, pp. 1-10.*

(Continued)

*Primary Examiner* — Jon Chang
(74) *Attorney, Agent, or Firm* — Hickman Palermo Becker Bingham LLP (57) ABSTRACT

A dynamically reconfigurable heterogeneous systolic array is configured to process a first image frame, and to generate image processing primatives from the image frame, and to store the primatives and the corresponding image frame in a memory store. A characteristic of the image frame is determined. Based on the characteristic, the array is reconfigured to process a following image frame.

37 Claims, 8 Drawing Sheets

(56) References Cited

U.S. PATENT DOCUMENTS

| | | |
|---|---|---|
| 2004/0017938 A1 | 1/2004 | Cooper et al. |
| 2006/0140445 A1 | 6/2006 | Cusack, Jr. |
| 2006/0228027 A1 | 10/2006 | Matsugu et al. |
| 2007/0013791 A1 | 1/2007 | Kinoshita et al. |
| 2007/0022304 A1 | 1/2007 | Yanagawa |
| 2007/0115357 A1 | 5/2007 | Stein et al. |
| 2012/0106790 A1 | 5/2012 | Sultana et al. |
| 2012/0200689 A1 | 8/2012 | Friedman et al. |
| 2015/0042670 A1 | 2/2015 | Zaharia et al. |

FOREIGN PATENT DOCUMENTS

| | | |
|---|---|---|
| JP | 2010020597 A | 1/2010 |
| WO | 2012/004672 A2 | 1/2012 |
| WO | 2012/004672 A3 | 6/2012 |
| WO | 2012/004672 A9 | 4/2013 |

OTHER PUBLICATIONS

PCT Notification of Transmittal of the International Search Report and the Written Opinion of the International Searching Authority, or the Declaration, for PCT Application No. PCT/IB2011/001942, report dated Feb. 1, 2013, 11 pages.

Nao Iwata, Shingo Kagami, Koichi Hashimoto: "A Dynamically Reconfigurable Architecture Combining Pixel-Level SIMD and Operation-Pipeline Modes for High Frame Rate Visual Processing", Field-Programmable Technology, 2007. ICFPT 2007. International Conference on, IEEE, Dec. 1, 2007, pp. 321-324, XP031208417.

Sudarsanam A, Barnes R, Carver J, Kallam R, Dasu A: "Dynamically reconfigurable systolic array accelerators: a case study with extended Kalman filter and discrete wavelet transform algorithms", IET Computers and Digital Techniques, vol. 4, No. 2, Mar. 4, 2010, pp. 126-142, XP006034806, DOI:http://dx.doi.org/10.1049/IET-CDT:20080139.

Gilles Sassatelli, Lionel Torres, Pascal Benoit, Thierry Gil, Camille Diou, Gaston Cambon, Jerome Galy: "Highly scalable dynamically reconfigurable systolic ring-architecture for DSP applications", Proceedings Design, Automation and Test in Europe, Mar. 4, 2002, pp. 553-558, XP002234644.

Sayfe Kiaei, Jaisimha K. Durgam: "VLSI Design of Dynamically Reconfigurable Array Processor-Drap", Acoustic, Speech and Signal Processing, ICASSP-89. Glasgow, May 23-26, 1989; New York, IEEE, US, vol. 4, May 23, 1989, pp. 2484-2488, XP000090119.

Zhang, H.; Prabhu, V.; George, V.; Wan, M.; Benes, M.; Abnous, A.; Rabaey, J.M.: "A 1-V heterogeneous reconfigurable DSP IC for wireless baseband digital signal processing", IEEE Journal of Solid-State Circuits, IEEE Service Center, Piscataway, NJ, USA, vol. 35, No. 11, Nov. 1, 2000, pp. 1697-1704, XP002413277, DOI:http://dx.doi.org/10.1109/4.881217.

Woods R.E, Gonzalez R. C.: "Real-Time Digital Image Enhancement", Proceedings of the IEEE, vol. 69, No. 5, May 1981, pp. 643-654, XP002690597.

PCT Notification of Transmittal of International Preliminary Report on Patentability Chapter I of the Patent Cooperation Treaty, International Preliminary Report on Patentability Chapter I, for PCT Application No. PCT/IB2011/001942, report dated Jan. 8, 2013, 7 pages.

Jerome Dubois, Dominique Ginhac, Michel Paindavoine, and Barthelemy Heyrman: "A 10 000 fps CMOS Sensor with Massively Parallel Image", Processing IEEE Journal of Solid-State Circuits; vol. 43, Issue: 3, 2008, 12 pages, Retrieved from http://citeseerx.ist.psu.edu/viewdoc/summary?doi=10.1.1.108.6369.

William H. Robinson; D. Scott Wills: "Design of an Integrated Focal Plane Architecture for Efficient Image Processing", In Proc. Int. Conf. on Parallel and Distributed Computing Systems (2002), pp. 128-135. Retrieved from http://citeseerx.ist.psu.edu/viewdoc/summary?doi=10.1.1.132.6728.

Jones, M and Viola, P., Fast multi-view face detection, Mitsubishi Electric Research Lab, 2003. http://www.merl.com/papers/docs/TR2003-96.pdf.

Paul Viola, Michael Jones, Robust Real-time Object Detection, Second International Workshop on Statistical and Computational Theories of Vision—Modeling, Learning, Computing, and Sampling, Vancouver, Canada, Jul. 13, 2001. 25 pages.

PCT Notification of Transmittal of the International Search Report and the Written Opinion of the International Searching Authority, or the Declaration, for PCT Application No. PCT/IB2011/001942, report dated Apr. 18, 2012, 13 pages.

Alexandro M. S. Adário, Eduardo L. Roehe, Sergio Bampi: "Dynamically Reconfigurable Architecture for Image Processor Applications." In: Proceedings of the 36th Design Automation Conference, 1999 [online]. Retrieved on Apr. 2, 2012. Retrieved from the Internet at URL:<http://www.cs.york.ac.uk/rts/docs/SIGDACompendium-1994-2004/papers/1999/dac99/pdffiles/35_3.pdf.

PCT Notification of Transmittal of International Preliminary Report on Patentability Chapter I of the Patent Cooperation Treaty, International Preliminary Report on Patentability Chapter I, for PCT Application No. PCT/IB2011/001942, report dated Feb. 26, 2013, 6 pages.

Non-Final Rejection, dated Sep. 11, 2013, for U.S. Appl. No. 13/282,458, filed Oct. 26, 2011.

Japan Patent Office, "Office Action" in application No. 2013-517585, dated Jan. 20, 2015, 10 pages.

Claims in Japan application No. 2013-517585, dated Jan. 2015, 7 pages.

\* cited by examiner

Figure 1

(Prior Art)

Figure 2

(Prior Art)

REAL-TIME VIDEO FRAME PRE-PROCESSING HARDWARE

PRIORITY

This application claims priority to U.S. provisional patent application Ser. No. 61/362,247, filed Jul. 7, 2010.

BACKGROUND

Figure 1:
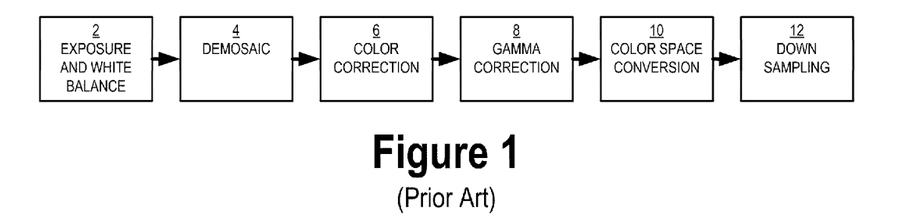
FIG. 1 illustrates a conventional image processing pipeline (IPP).

After images are acquired by an image sensor within a digital imaging system, the images are typically processed before display or storage on the device. A typical image processing chain or image processing pipeline, or IPP, is illustrated in FIG. 1. The example IPP shown in FIG. 1 includes an exposure and white balance module 2, a demosaic block 4, a color correction block 6, a gamma correction block 8, a color conversion block 10 and a downsampling module 12.

When it is desired to implement a real-time video imaging system, there are often significant constraints with such IPP, because image data is typically read from memory on each stage of the IPP and then written back after some operations. For HD video, the memory bandwidth experiences significant challenges. Thus, it is desired to implement elements of the IPP directly in hardware embodiments in video acquisition devices. This would have the advantage that elements of the IPP avoid the challenge of writing image data to memory after each stage of processing, and reading back the data for each subsequent IPP operation. However, it implies that the methods applied at each stage of the IPP could be less adaptable, as the entire IPP chain would be configured prior to inputting data from a single image frame.

Modern digital still cameras (DSC) implement more sophisticated image and scene analysis than can be provided by a basic IPP as illustrated with some example blocks at FIG. 1. In particular, image acquisition devices can detect and track face regions within an image scene (see U.S. Pat. Nos. 7,620,218, 7,460,695, 7,403,643, 7,466,866 and 7,315,631, and US published applications nos. 2009/0263022, 2010/0026833, 2008/0013798, 2009/0080713, 2009/0196466 and 2009/0303342 and U.S. Ser. Nos. 12/374,040 and 12/572,930, which are all assigned to the same assignee and hereby incorporated by reference), and these devices can analyze and detect blemishes and imperfections within such regions and correct such flaws on the fly (see the above and U.S. Pat. No. 7,565,030 and US published application no. 2009/0179998, incorporated by reference). Global imperfections such as dust blemishes or "pixies" can be detected and corrected (see, e.g., U.S. Ser. Nos. 12/710,271 and 12/558,227, and U.S. Pat. Nos. 7,206,461, 7,702,236, 7,295,233 and 7,551,800, which are all assigned to the same assignee and incorporated by reference). Facial enhancement can be applied. Image blur and image motion, translational and rotational, can be determined and compensated (see, e.g., U.S. Pat. No. 7,660,478 and US published applications nos. 2009/0303343, 2007/0296833, 2008/0309769, 2008/0231713 and 2007/0269108 and WO/2008/131438, which are all incorporated by reference). Facial regions can be recognized and associated with known persons (see, e.g., U.S. Pat. Nos. 7,567,068, 7,515,740 and 7,715,597 and US2010/0066822, US2008/0219517 and US2009/0238419 and U.S. Ser. No. 12/437,464, which are all incorporated by reference). All of these techniques and others (see, e.g., U.S. Pat. Nos. 6,407,777, 7,587,085, 7,599,577, 7,469,071, 7,336,821, 7,606,417 and 2009/0273685, 2007/0201725, 2008/0292193, 2008/0175481, 2008/0309770, 2009/0167893, 2009/0080796, 2009/0189998, 2009/0189997, 2009/0185753, 2009/0244296, 2009/0190803, 2009/0179999 and U.S. Ser. No. 12/636,647, which are assigned to the same assignee and hereby incorporated by reference) rely on an analysis of an image scene. Typically, this involves the reading of blocks of image data from a memory store followed by various processing stages of this data. Intermediate data structures may be stored temporarily within the image store to facilitate each scene analysis algorithm. In some cases, these data are specific to a single algorithm, while in others, data structures may persist across several different scene analysis algorithms. In these cases, image data is moved between image store memory and a CPU to perform various image processing operations. Where multiple algorithms are applied, image data is typically read several times to perform different image and scene processing operations on each image.

For most of the above techniques, analysis may involve a preview image stream which is a stream of relatively low resolution captured by most digital cameras and used to provide a real-time display on the camera display. Thus, in order to properly analyze the main image scene, it is useful to have at least two images of substantially the same scene available. Where one or more preview images are also stored, these are also typically read on multiple occasions in combination with the main acquired (full resolution) image. In addition, processing may involve temporarily storing upsampled copies of preview images or downsampled copies of main acquired images to facilitate various scene analysis algorithms.

Within a digital camera, images are typically acquired individually and a substantial time interval, typically of the order of a second or more, is available between image acquisitions for scene analysis and post processing of individual images. Even where multiple images are acquired in close temporal proximity, e.g., in a burst mode of a professional DSC, a finite number of images may be acquired due to limited memory. Furthermore, these images cannot be processed during the burst acquisition, but often wait until it is completed before more sophisticated scene-based processing can be implemented.

Within a modern video appliance, data is often processed at frame rates of 30 fps or more, and due to memory constraints, the data is digitally compressed and written to a long-term memory store more or less immediately. Furthermore, a low-resolution preview stream is not generally available as in the case of a DSC. Finally, the requirements of handling a full-HD video stream imply that memory bandwidth is challenging within such an appliance.

In order to achieve the benefits of modern scene analysis techniques such as are presently available within a DSC for a HD video acquisition device we can thus identify several key challenges. Firstly, it is difficult to store and perform complex scene analysis on a full HD within the time available between video frame acquisitions. This is not simply a matter of CPU power, but perhaps more importantly a matter of data bandwidth. The size of full HD images implies that it is very challenging simply to move such images through an IPP and into a video compression unit onto long-term storage. While some limited scene analysis may be possible through hardware additions to the IPP, this would likely involve many settings and configurations that are fixed prior to beginning real-time acquisition of the video stream, such that they would not be dynamically adaptable and responsive to ongoing scene analysis.

Figure 2:
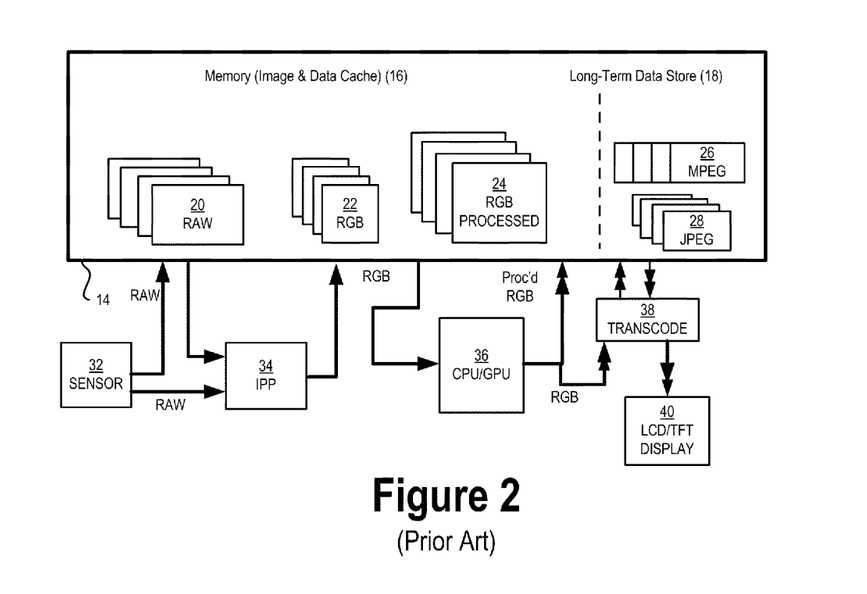
FIG. 2 illustrate conventional hardware to implement an IPP and other high level functions in software.

Secondly, there is no scope to share image processing data primitives between scene analysis algorithms without introducing very large shared memory buffers into the IPP. This would lead to hardware design requirements which are unreasonable and effectively mimic the existing state-of-art, illustrated in FIG. 2, within a single IC. FIG. 2 illustrates conventional hardware to implement an IPP and other high level functions in software. A memory 14 is shown that includes an image and data cache 16 as well as a long term data store 18. The cache 16 can store raw data 20, RGB formatted data 22 and RGB processed data 24, while the long term data store 18 may hold MPEG images 26 and/or JPEG images 28. A sensor 32 communicates raw data to the memory 14 and to the IPP 34. The IPP 34 also receives data from the memory 14. The IPP 34 provides RGB data 22 to the memory 14,16. RGB data 22,24 is also retrieved by the CPU 36 which provides processed RGb data 24 to the memory 14 and RGB data 22 to a transcode module 38. The trasncode module 38 provides data to and retrieves data from the memory 14,18. The transcode module also provides data to be shown on, e.g., a LCD/TFT display 40.

For various practical reasons, this does not provide an optimal image processing mechanism. An alternative is to have separate hardware implementations for each scene analysis algorithm, but this will also lead to very large hardware sizes as each algorithm would use buffer a full image frame in order to perform full scene analysis.

There are many additional engineering subtleties within each of these broad areas, but it is possible to identify a broadly scoped challenge wherein current scene analysis techniques and resulting image enhancement benefits are not sensibly applied to real time video using current state-of-art techniques. An advantageous set of embodiments are therefore provided below.

DETAILED DESCRIPTIONS OF THE EMBODIMENTS

Embodiments are described below that include a hardware sub-system which generates a range of image processing primitives derived in real-time from an image frame which is input serially, pixel-by-pixel with a delay which is significantly less than that associated with acquiring a full image frame. These primitives are available very soon or even almost immediately after an image frame has been acquired and can be used to further process this image frame when the next image frame is being acquired.

In addition, data determined from the processing of a previous image frame in a sequence can be made available for combination with image processing primitives derived from the present image frame. This enables detailed frame by frame scene processing without separately capturing a low-resolution preview stream of images (although such may be optionally utilized in certain embodiments).

Embodiments are also described that operate using a one pixel per clock cycle input and/or that generate a number of different types of image processing primitives which provide useful knowledge about the current image/video frame. Each primitive is generated by a processing chain which comprises one or more pixel processing blocks, or modules. These are linked together by a plurality of internal data busses which may be dynamically switched. In certain less complex embodiments modules may have directly linked data paths, although the primary input modules may share a common input data path from the image sensor/IPP. Multiple modules may share the same input data. Further, the output of individual processing blocks may be combined logically. The individual outputs from multiple processing chains are typically combined into a single data word before being output to external memory (SDRAM) as this facilitates optimal use of memory and external memory busses. Because of the differences in processing time between processing chains, a synchronization module is integrated with logical circuitry to ensure correct alignment of the output data.

The generated image primitives can advantageously be used to accelerate the performance of a range of image processing operations including red-eye detection, face detection and recognition, face beautification, frame-to-frame image registration, and multi-frame image joining for creation of panorama images, among many more applicable image processing techniques. Further, the availability of these primitives greatly simplifies the implementation of a range of scene analysis and processing algorithms. This can advantageously reduce, in particular, the tendency to read and write the full image frame from the memory store for subsequent processing on a CPU or GPU. In most cases the relevant image primitive(s) and the main image are only read once in order to analyze and/or enhance the image with a particular algorithm. It is also possible to load primitives from multiple algorithms together with a single read of the main acquired image in order to execute these multiple algorithms on a single image read. This greatly reduces the memory bandwidth utilized to process a video stream. Where separate read/write buses are available, it is also possible to process one image frame on a main CPU/GPU while a second image frames is being acquired and pre-processed by IPP and AHIP modules.

Further, this system configuration enables data derived from the analysis of an image frame being processed by the CPU/GPU to be fed back to the IPP or the AHIP module to adapt the pre-processing of a following image frame. This detailed adaption of both the global image processing applied by the IPP and the scene-specific image processing applied by the AHIP enables faster and more responsive performance of a video acquisition appliance. This, in turn, allows faster adaptation of video acquisition in situations where lighting conditions are changing, e.g., based on an analysis of face regions and associated color maps of the skin. Such techniques are advantageously now applicable to video acquisition in accordance with certain embodiments.

In this regard, a frame counter and associated logic may also be utilized in certain embodiments. At the end of each frame processing cycle, it is possible to reconfigure internal pixel processing chains. This may involve loading new LUTs, changing the processing parameters of individual pixel processing blocks or in some cases reconfiguring the order or logical combination of blocks in a processing chain. In certain embodiments, modules are either selected or bypassed. In more sophisticated embodiments, data processing modules share an I/O port on one or more internal data-busses. In certain embodiments, double-buffered I/O may be employed to enable near simultaneous read/write operations to/from a module.

Systolic Arrays

The systolic array paradigm, i.e., data-stream-driven by data counters, is the counterpart of the von Neumann paradigm, i.e., instruction-stream-driven by a program counter. Because a systolic array usually sends and receives multiple data streams, and multiple data counters are used to generate these data streams, it supports data parallelism. The name derives from analogy with the regular pumping of blood by the heart.

Figure 3:
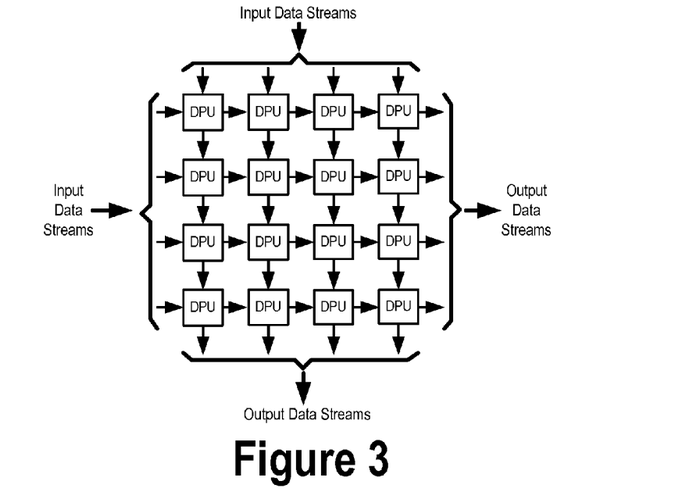
FIG. 3 illustrates a homogeneous systolic array architecture.

A systolic array is composed of matrix-like rows of data processing units called cells. Data processing units, or DPUs, are similar to central processing units (CPU)s, except for the lack of a program counter, since operation is transport-triggered, i.e., by the arrival of a data object. Each cell shares the information with its neighbours immediately after processing. The systolic array is often rectangular or otherwise has its cells arranged in columns and/or rows where data flows across the array between neighbour DPUs, often with different data flowing in different directions. FIG. 3 illustrates such an example of a homogeneous systolic array architecture. The data streams entering and leaving the ports of the array are generated by auto-sequencing memory units, or ASMs. Each ASM includes a data counter. In embedded systems, a data stream may also be input from and/or output to an external source.

Systolic arrays may include arrays of DPUs which are connected to a small number of nearest neighbour DPUs in a mesh-like topology. DPUs perform a sequence of operations on data that flows between them. Because traditional systolic array synthesis methods have been practiced by algebraic algorithms, only uniform arrays with only linear pipes can be obtained, so that the architectures are the same in all DPUs. A consequence is that only applications with regular data dependencies are generally implemented on classical systolic arrays.

Like SIMD (single instruction/multiple data) machines, clocked systolic arrays compute in "lock-step," with each processor undertaking alternate compute/communicate phases. However, systolic arrays with asynchronous handshaking between DPUs are often called wavefront arrays. One well-known systolic array is Carnegie Mellon University's iWarp processor, which has been manufactured by Intel. An iWarp system has a linear array processor connected by data buses going in both directions.

AHIP (Advanced Hardware for Image Processing)

Figure 4:
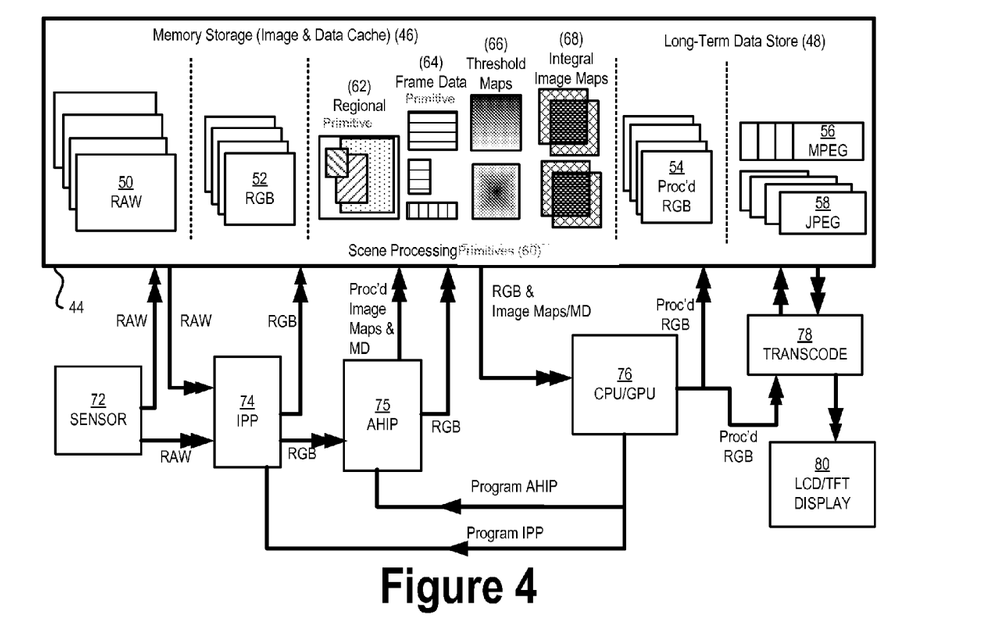
FIG. 4 illustrates IPP hardware with advanced hardware for image processing, or AHIP, including a pass-through characteristic, in accordance with certain embodiments.

FIG. 4 schematically illustrates an embodiment that includes IPP hardware with AHIP (advanced hardware for image processing). The AHIP illustrated at FIG. 4 has a pass-through nature. FIG. 4 shows a memory store 44 including am image and data cache 46 and long-term data store 48. The cache 46 includes raw data 50, RGB data 52 and processed RGB data 54, and the long term data store may include MPEG images 56 and/or JPEG images 58. The embodiment illustrated at FIG. 4 also advantageously includes scene processing primitives 60 including e.g., regional primitives 62, frame data primitives 64, threshold maps 66 and/or integral image maps 68.

FIG. 4 also shows a sensor 72 that communicates raw data to the memory 44 and to an IPP 74. The IPP 74 also receives raw data from the memory 44. The IPP 74 provides RGB data 52 to the memory 44,46. RGB data is provided to an advantageous AHIP module 75 by the IPP 74. The AHIP module 75 provides processed image maps, AHIP module data and RGB data to the memory 44,46. The memory 44,46 provides RGB data, image maps and AHIP module data to the CPU/GPU 76. The CPU 76 provides processed RGB data 54 to the memory 44 and to a transcode module 78. The CPU 76 can also program the IPP module 74 and/or the AHIP module 75, as schematically illustrated at FIG. 4. The transcode module 78 provides data to and retrieves data from the memory 44,48. The transcode module 78 also provides data to be shown on, e.g., a LCD/TFT display 80.

Advantageously, in certain embodiments one standard image pixel is taken per clock cycle and this pixel is processed in one or more of a variety of ways. Several different types of output may be generated in parallel from the processing of each individual pixel. More than one instance of each output type can be provided by duplication of hardware elements. Because this hardware sub-system can process a pixel on every clock cycle, it does not delay the transfer of image pixels from the sensor and thus it can be inserted at any stage of the IPP.

A number of generic types of image processing primitives can be identified and are generated by the AHIP module. To clarify the following discussion, image data may be referred to as "pixels" (picture elements) and data values in an output primitive may be referred to as "map-pixels". Typically a map-pixel will be significantly smaller than a pixel (24 or 32 bits). As examples, one form of map-pixel used for skin maps has only two-bits corresponding to 4 probabilities of the original pixel being a skin pixel. Another map-pixel has 4 bits corresponding to 16 thresholds describing how similar it is to a particular color in a predefined color space. The color-space thresholds corresponding to these 16 levels of similarity are stored in a LUT with the final output data primitive map comprising map-pixels.

The first such primitive includes a direct pixel to map-pixel mapping. In certain embodiments, this may include a color or luminance thresholding which determines how close a particular pixel is to a predetermined value in the color space. In certain embodiments, this data may be captured as a range of 15 thresholds and written into a 4-bit image map. These thresholds can be adjusted from image frame to image frame by the CPU/GPU.

In an exemplary embodiment, the data values of each threshold are set to measure how close image pixels are to a skin color. Such an image map can be advantageously used to differentiate different skin areas of a facial region and can be useful for applications such as face tracking and facial beautification.

This form of image primitive only incurs a small fixed delay in terms of clock cycles. The output image map is typically available within a few tens of clock cycles after the last pixel of an image frames is input to the AHIP.

One variant on the pixel to map-pixel processing is when multiple pixels are processed, generating a single output pixel. This corresponds to a subsampling of the RAW input image. In some embodiments, a block of pixels is stored temporarily in hardware line buffers before being processed to generate the corresponding output primitive data. In alternative embodiments, pixels continue to be processed individually but the outputs from processing each individual pixel are combined in some predetermined way to generate a single map-pixel.

A second form of primitive is a kernel derived primitive. The map-pixels for such primitives are derived from knowledge of the current image pixel and at least one previous pixel of the image. Many techniques specify N×N kernels, which implies that the output value corresponding to the current pixel is determined from N adjacent pixels in both horizontal and vertical directions within the image. As pixel data is typically only available to the AHIP module sequentially in certain embodiments, it will be clocked directly in those embodiments, row by row (and/or column by column), from the image sensor through the IPP. Full rows of image data would typically be buffered in these embodiments to support kernel derived primitives.

In certain embodiments, seven (7) rows of image data are stored in their entirety and an $8^{th}$ image row is rolled over. This enables the module to generate image processing primitives derived from up to an 8×8 kernel. In this embodiment, there is a delay of the order of 8 times the row size of the image (8×1920 for 1080 p) before a full kernel primitive image map is available for the current image frame. Nevertheless this is still less than 1% of the total time taken to acquire the full image frame (1000 pixel rows) so that the image frame primitive data is available very shortly after the final frame acquisition is completed.

One particular example of a kernel derived image processing primitive is that of red-eye segmentation. In U.S. Pat. No. 6,873,743, for example, which is incorporated by reference, a technique for performing a 2×2 segmentation on an image is described. This operates on LAB color space. Another example of a kernel derived primitive is the calculation of the integral image which is performed on the luminance component of an image. As will be explained shortly, the AHIP incorporates in certain embodiments a color-space transform module which enables on-the-fly conversion of input pixel data between several commonly used color spaces. Thus individual RGB pixel data can be converted to YCC or Lab color space with negligible delay within the AHIP.

A third form of primitive includes frame derived primitives. These are examples of data primitives where a single pixel or a block of pixels do not generate a corresponding single map-pixel output. One example of this form of image processing primitive is a histogram module which is preconfigured with a number of bins. Input pixel data is analyzed for a set of thresholds and classified into a histogram bin based on its value. At the end of an image frame each histogram bin contains a count of the number of pixels which satisfy its upper and lower threshold limits.

When combined with the example given for primitive type one, it is possible to measure how many pixels in a particular image frame fell within a set of 16 skin-color histogram bins. This, in turn, may suggest that skin color thresholds need to be adjusted for the next image frame if, for example, too many, or too few, skin pixels were detected within a tracked face region. The hardware architecture within the AHIP is designed to enable processing blocks to be dynamically reconfigured prior to processing an image frame. Additional parallel processing blocks can be added to such a hardware architecture in accordance with certain embodiments.

In other embodiments, a color correlogram or other forms of histogram-like data may be determined by the AHIP. Such primitives may advantageously be determined from the same set of row buffers used to generate kernel data, the difference being that histogram or correlogram data provides frame derived primitives determined from multiple pixels rather than the one-to-one mapping of input to output pixels provided by kernel derived primitives.

Another form of frame derived primitive includes one that performs a summation of pixel row and pixel column values. This enables a correlation of the current image frame with one or more previous image frames. Such primitives introduce another aspect of the AHIP where one or more of the primitives determined from the current frame may be remembered for one or more subsequent image frames. Such primitive may be significantly smaller than the full image frame or the advantages of real-time processing will not be fully realized. In certain embodiments, a typical size limit for such primitives is that they are no larger than the maximum row size of the processed image.

In certain embodiments, such data may be retained within the AHIP module rather than being written to the external memory store. Thus image frame derived data and/or pixel derived data may be accumulated within the AHIP to facilitate faster processing of image frame primitives.

A fourth form of primitive is derived from a specific spatial region of the main image frame. These primitives may be more complex in nature and may combine more complex hardware processing of a region with some base primitives and external data derived from the CPU/GPU and relating to one or more preceding image frames.

Hardware buffers may be used in processed that involve predicting locations of face regions in digital images (see, e.g., U.S. Pat. No. 7,315,631 and its progeny, and U.S. Pat. No. 7,466,866, e.g., incorporated by reference above). In certain embodiments, knowledge is gathered in one or more previous frames as to where one can expect a face to be detected within the current image frame. This approach has the advantage of being faster than performing face detection in the current frame, and the gathered information may be used for various purposes even before the current image frame.

In particular, it is generally difficult to determine a highly precise location of such a region during a first processing of an image frame because this depends on additional image processing to be performed in software on the GPU/CPU. As a consequence, it is generally only determined approximately where a spatial region is during a first hardware processing of an image frame by AHIP. However these approximate locations can be advantageously marked and are typically significantly smaller than the main image. In one embodiment, several such predicted regions may be stored within buffers of the AHIP for further processing on the next frame cycle. In an alternative embodiment, these are written to memory with the main image, but are loaded back through a second AHIP module configured especially to process such regions. In this second embodiment, advantage is taken of the fact that the memory subsystem is dual-ported. Thus when the next image frame is being processed by the primary AHIP and written to memory, the one or more predicted regions from the previous image frame may be read back to the second AHIP module for more specialized processing. In this embodiment, specific image regions would be processed typically only while the next image frame is being generically processed. Nevertheless a single frame delay can be easily compensated for and does not compromise the goal of achieving close to real-time processing of a video sequence.

One very common spatial region is a predicted face region. This is a region of the current image frame within which it is highly probably that a face region will be located. Such regions are frequently used in face tracking algorithms (again see U.S. Pat. No. 7,315,631 and its progeny, incorporated by reference above). One common use of such regions is to restrict the application of an image processing algorithm, such as red-eye detection, to an image region where there is high probability that a face will occur.

Figure 5:
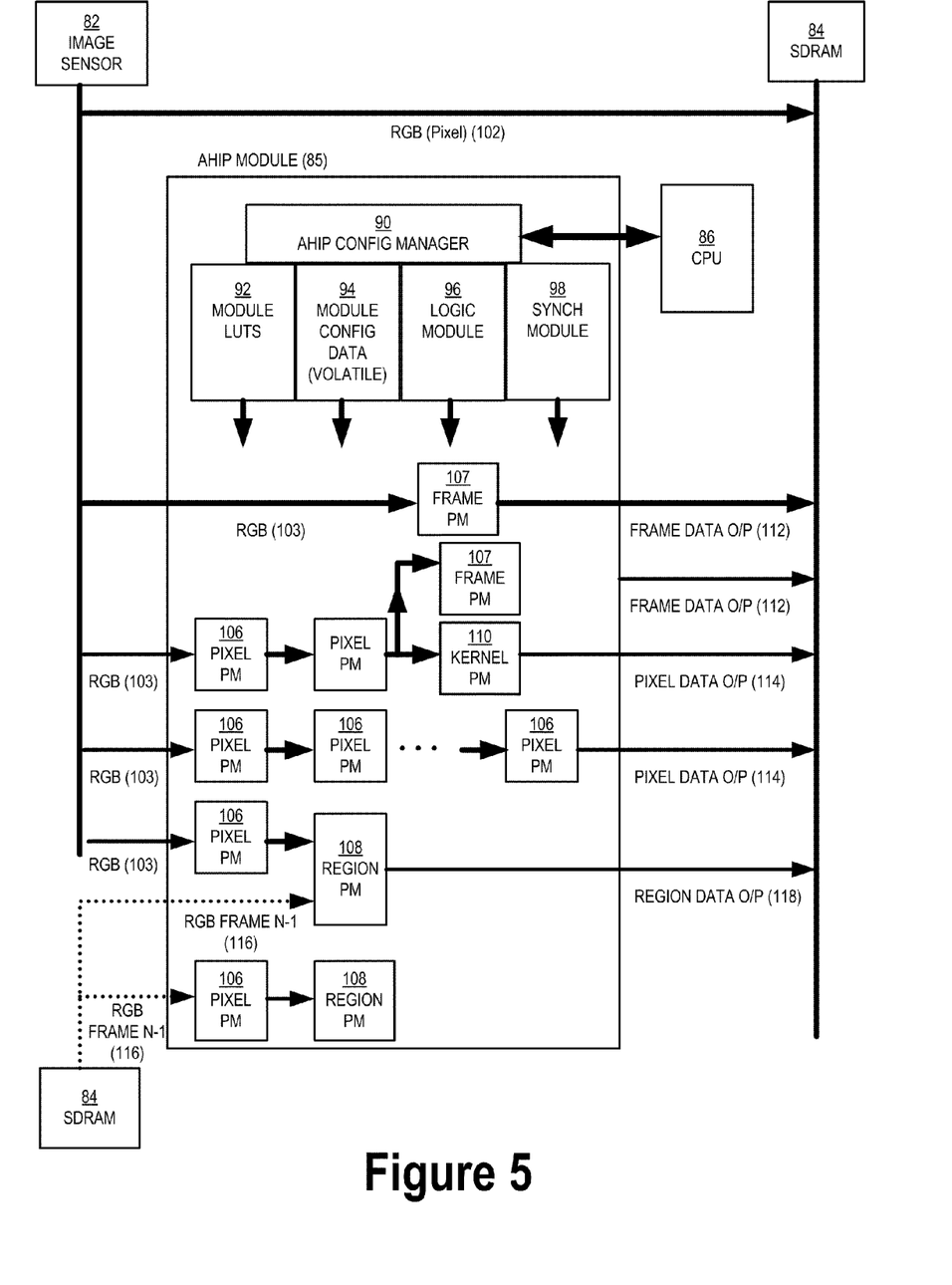
FIG. 5 illustrates an AHIP module including several generic processing modules arranged into processing chains for various image processing primitives, in accordance with certain embodiments.

FIG. 5 schematically illustrates an AHIP module with several generic processing modules arranged into processing chains for various image processing primitives. An image sensor 82, SDRAM memory 84, the AHIP module 85 itself, and a CPU 86 are shown in FIG. 5. The AHIP module includes an AHIP configuration manager 90 that communicates with the CPU 86. The AHIP module 85 also includes a look-up table (LUT) module 92, a data configuration module 94, a logic module 96, and a synch module 98. As previously illustrated in FIG. 4, certain RGB data 102 is stored straight away into the memory 84. However, certain other RGB data 103 is processed by the AHIP module 85 at one or more pixel processing modules 106, one or more frame processing modules 107, one or more region processing modules 108 and one or more kernel processing modules 110. Certain RGB data 103 may be processed at a frame processing module, and that frame data 112 is stored in the memory 84. Certain RGb data 103 may be processed at one or more pixel processing modules 106, and then either pixel data 114 is stored in the memory 84 or that data is further processed at a kernel processing module 110 and/or at a frame processing module 107 and/or a region processing module 108. RGB data 116 of an adjacent frame, such as a previous frame (indicated by N−1), may be processed together with the RGB data 103 at a region processing module 108. Data processed at the region processing module 108 may then be stored in memory 84 as region data 118.

It may be often desirable to apply an algorithm to portions of an image before, e.g., it is possible to even make a full confirmation of the precise location of a face region. These predicted face regions can be determined from previous image frames and can take advantage of a history of face and camera movement over a number of preceding frames. In this regard, the frame-to-frame dX and dY displacements may be determined by the AHIP module and may be available within a short delay after the last pixel of a frame is processed. Similarly, the location and size of a face region may be accurately known for the last number of one or more frames of a face tracker algorithm and both of these data can be available very soon after the processing of a new image frame is started by AHIP. These data can advantageously enable an accurate and dynamic estimation of predicted face regions for the current image frame (see US published applications nos. US2009/0303342 and US2009/0263022, and U.S. Pat. Nos. 7,460,695, 7,403,643 and 7,315,631, as well as US2009/00123063, US2009/0190803, US2009/0189998, US20090179999 and U.S. Ser. Nos. 12/572,930, 12/824,214 and 12/815,396, which are all assigned to the same assignee and hereby incorporated by reference.

Face regions or face feature regions such as eye regions and/or mouth regions and/or half face regions (see U.S. Ser. Nos. 12/790,594 and 12/825,280, which are assigned to the same assignee as the present application and hereby incorporated by reference) can be initially saved to a local memory buffer. Typically, as memory is expensive in a hardware core, there may be a limited number of "face buffers," and they may be optimized to minimize size. Indeed in some embodiments such buffers may be external to the AHIP and may involve bandwidth to write these regions to the main external memory store. In other embodiments, their locations within the main image may be recorded, such that they may be later accessed within the main image frame data from the main memory store. In one embodiment, such regions will be stored internally within the AHIP module. However as the size of AHIP buffer may or may not be too large for full HD video, in an alternative embodiment, these face regions are stored with the main image in main memory and reloaded into a secondary AHIP module while the next main image frame is being processed and written to main memory.

In these embodiments, as many face detection and recognition techniques can be applied to a fixed size face image, these memory buffers may be large enough to accommodate such a fixed size face region with some additional capacity. The additional capacity may be used to compensate for a number of factors: (i) the image region is predicted and thus the highly precise location of a face is not known at the time of initial AHIP processing of the image; (ii) the face region may not be correctly upright and may need to be rotated in-plane to obtain a properly upright face region; this information may be made available later after the precise location of the face regions is determined and the location of the eye-regions within this face region are determined; at such time, an in-plane correction angle and re-sizing information can be provided to the AHIP, but until such time the face region may be at an in-plane angle involving additional memory space to accommodate diagonally oriented face regions; (iii) the face region may change in global size from frame to frame; while some trends may be known from the history of past image frames, it is also possible that there may have been a change from these trends. Thus the precise size of a face may or may not be known until the regional data is processed by CPU/GPU after the main image frame processing is completed. In an alternative embodiment where face regions are loaded and processed while a next RAW image frame is processed and written, some additional processing of the main image and its associated primitives can be available from the CPU/GPU. In such cases a more precise estimate of the location of the face region may be available.

In another exemplary embodiment, it is assumed that a final fixed-size face region of maximum size 32×32 is involved. A memory buffer may be used for the face region of 64×64 to accommodate potential fractional resizing up to 1.99 and rotation of up to 45 degrees. This defines the buffer size for the precisely located face region, however when the current frame is first processed by AHIP we only know the predicted region of that image frame where a face is likely to exist. Accordingly, it may be useful to store a larger region, e.g., a buffer of 96×96 or 128×128 pixels may be used providing for predicted face region buffers which are 50% or 100% larger than the dimensions of the expected face region.

When data about the location and size of predicted face regions is passed from software processing of the previous image frame to the AHIP these predicted face regions are integer downsized into respective AHIP buffers of 96×96 or 128×128. Typically for processing of face regions it is only necessary to retain luminance values and thus these buffers are single-valued and full color data is typically not retained. However in some embodiments a form of skin-map may be generated and stored with the luminance image of the face region. Typically a skin map for face tracking purposes may be only 2-bits, representing only 3 or 4 states of skin-pixel.

An example of such a primitive is the application of face classifiers to a tracked face region. Typically the face region will not be exactly horizontal and so data from the predicted face region may be first rotated into a horizontal orientation prior to applying the face classifiers. Such manipulations require larger buffers for image data and so the number of regional buffers and the size of each may be somewhat limited. The primitives output in this example are a set of data values corresponding to a feature vector set which can be used to confirm that and/or (i) this region still contains a verified face; (ii) the feature vector set can be matched against a set of known faces to indicate a likely match.

Figure 6:
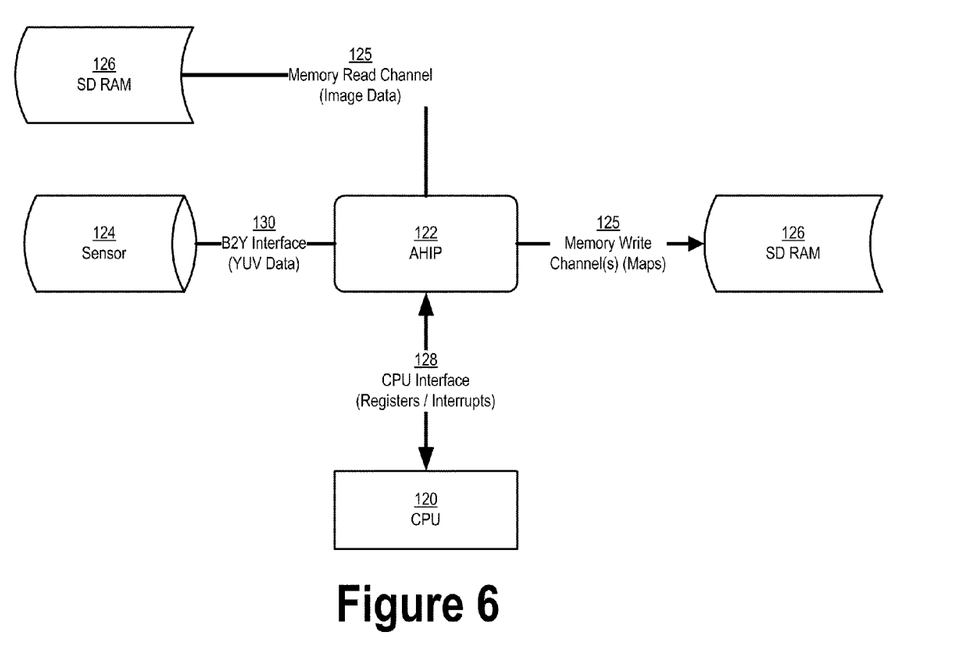
FIG. 6 illustrates an inter-relationship between a main CPU, hardware module, an image sensor and SDRAM read/write channels in accordance with certain embodiments.

FIG. 6 illustrates inter-relationships between a main CPU, an AHIP hardware module, an image sensor and read/write channels 125 of SDRAM memory 126. The AHIP/CPU interface 128 provides certain registers and/or interrupts. A B2Y interface 130 for YUV data is shown in FIG. 6 between the sensor 124 and the AHIP block 122.

Several principle types of image frame processing are implemented within the AHIP. Certain of these are now described below.

Frame-to-Frame AHIP Processing

Figure 7:
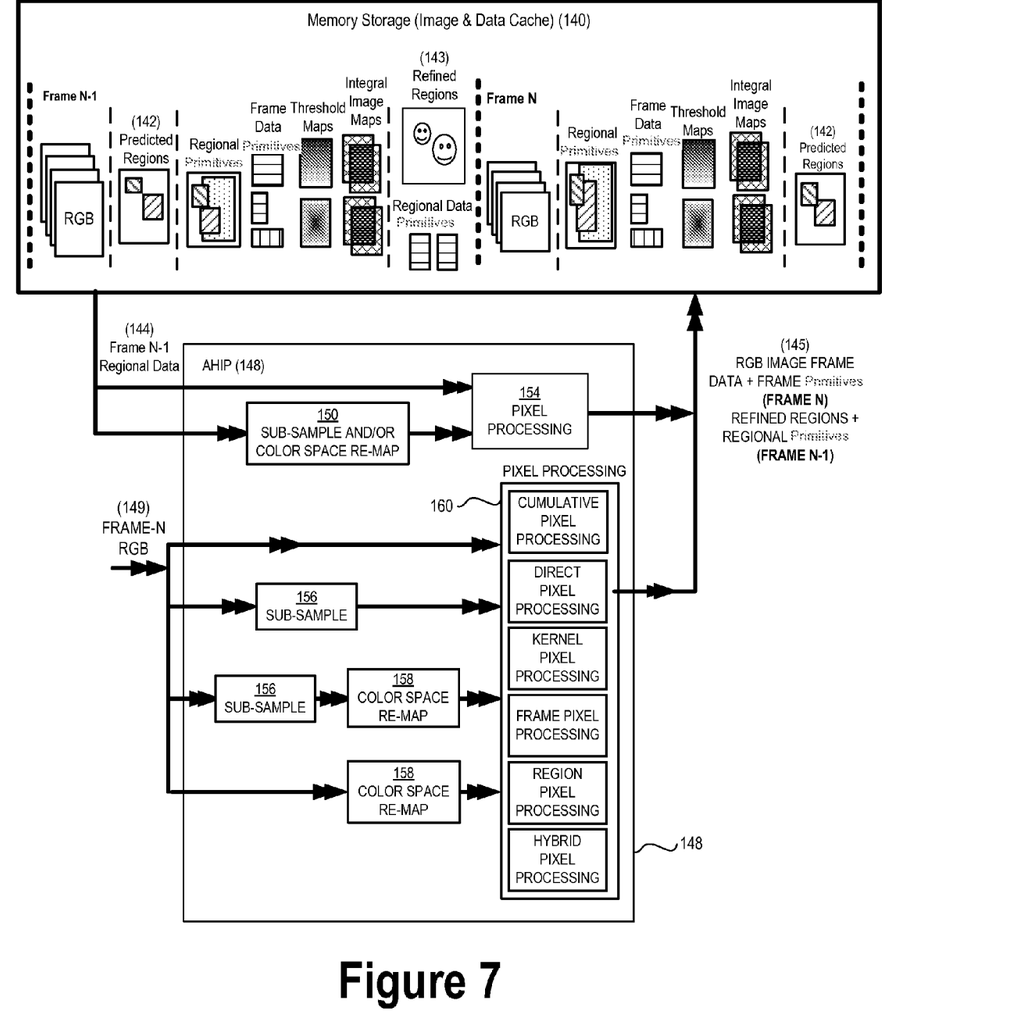
FIG. 7 illustrates interrelationships between a memory store including an image and data cache with an AHIP module in accordance with certain embodiments.

FIG. 7 illustrates use of data from frame N−1 combined with a current frame N. The memory store (image data and cache) 140 is segmented accordingly to the two frames in the illustrative example of FIG. 7. Some of the features have been described with reference to FIG. 4 and not repeated here. With respect to face tracking as an example, predicted regions 142 are stored in memory 140 for both the frame N−1 and frame N. Within the frame N−1 portion of the memory 140, refined regions and regional primitive data 143 are stored. These are used to generate RGB image frame data and frame primitives 145 for frame N. Frame N−1 regional data 144 is input to the AHIP block 148 along with frame N RGB data 149. The AHIP block subsamples and/or color space re-maps certain of the frame N−1 regional data at block 150, and then move all of the frame N−1 regional data 144 through a pixel processing block 154 to be output to memory 140 at the frame N portion. The frame N RGB data 149 may be sub-sampled 156 and/or color-space re-mapped 158 or neither prior to being pixel processed at block 160. The pixel processing 160 may include cumulative, direct, kernel, region and/or hybrid pixel processing. The data is then stored at the frame N portion of the memory 140.

Descriptions of certain of the various sub-elements of the AHIP Module in accordance with certain embodiments are now briefly described. The AHIP module may include any, all or none of these example sub-elements.

The Color Map Unit

Figure 8:
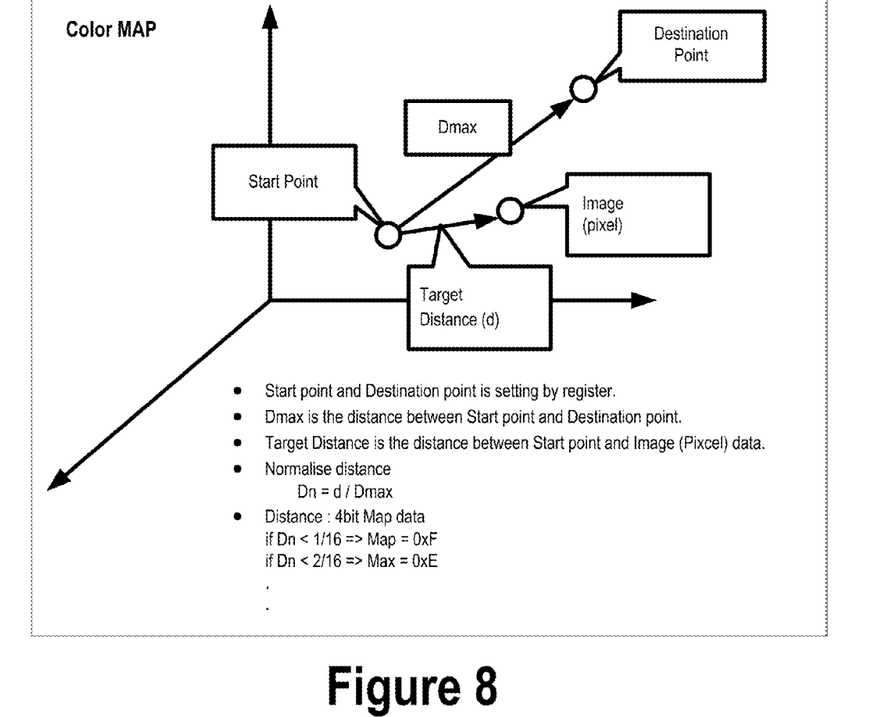
FIG. 8 illustrates a color thresholding module in accordance with certain embodiments.

The color map unit module produces a map of pixels having similar colors. A reference point R may be pre-programmed in an input color space (e.g., RGB). Then, for each input pixel P, the ColorMap module may compute an Euclidian distance d between P and R, and then compare it to 15 programmable thresholds (T1 . . . 15). These may be evaluated in a cascade, so they may advantageously be disposed in increasing order (T1<T2 . . . <T15—from very strict to very permissive). If d<$T_n$ then the module outputs the value 16−n.

If no threshold is matched then 0 is sent out. FIG. 8 illustrates a color thresholding module in accordance with certain embodiments.

The output of the colormap may be typically represented by 4 bits. In some embodiments a smaller set of thresholds may be implemented, e.g., using only 8 (3-bit), or 4 (2-bit), or 2 (1-bit). The ColorMap module may operate on an input full resolution image. The output map may have the same resolution as the input and each pixel may generate a matching output that indicates how closely it is matched to the pre-programmed reference pixel in a 3D color space.

In alternative embodiments, additional parallel color modules may enable a determination of how closely a pixel is matched to 2 of 3 color channels by setting one of the input channels to a zero or mid-point value. Other embodiments implement a 2D color module where only 2 of 3 channels are used for comparing.

Figure 9:
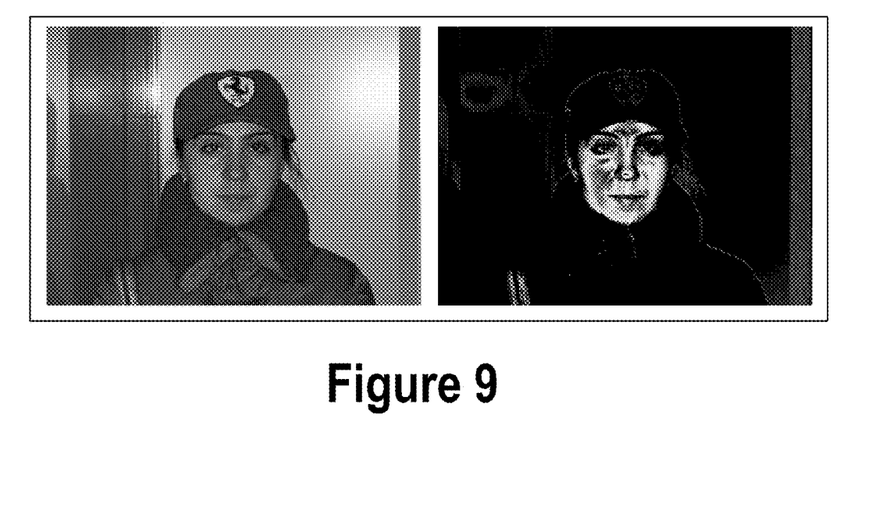
FIG. 9 illustrates an original image and skin-color map with 16 thresholds (4 bit) in accordance with certain embodiments.

As the functionality of the ColorMap module depends on the Euclidian distance, the input color space should be one where this distance is meaningful (proximity is equivalent to visual similarity). Normally, the module should be used with RGB input, but it is not limited to that. In FIG. 9, an example is provided of a ColorMap module being applied to an image. The reference point in this example is a skin-like color given in RGB coordinates. On the left in FIG. 9 there is shown the input image and on the right is the colormap (white represents the maximum value, the range is 0 to 15). In the example of FIG. 9, 16 thresholds (4 bit) were used.

Color Space Conversion (CSC) Unit

A CSC may be used to implements a programmable matrix multiplier defined as follows:

$$Ax + B = \begin{bmatrix} a11 & a12 & a13 \\ a21 & a22 & a23 \\ a31 & a32 & a33 \\ a41 & a42 & a43 \end{bmatrix} \times \begin{bmatrix} Y \\ U \\ V \end{bmatrix} + \begin{bmatrix} b1 \\ b2 \\ b3 \\ b4 \end{bmatrix} = \begin{bmatrix} a11Y + a12U + a13V + b1 \\ a21Y + a22U + a23V + b2 \\ a31Y + a32U + a33V + b3 \\ a41Y + a42U + a43V + b4 \end{bmatrix}$$

x=[Y, U, V]=input pixel, A and B=matrices with programmable coefficients.

This structure can perform conversions like YUV-2-RGB or RGB-2-YUV. It can also perform conversions between YUV and custom color spaces. These conversions may be used in conjunction with other modules in order to identify pixels with special properties.

A saturation function may be implemented at the output of the CSC (to limit values to the integer range of 0 . . . 255).

Figure 10:
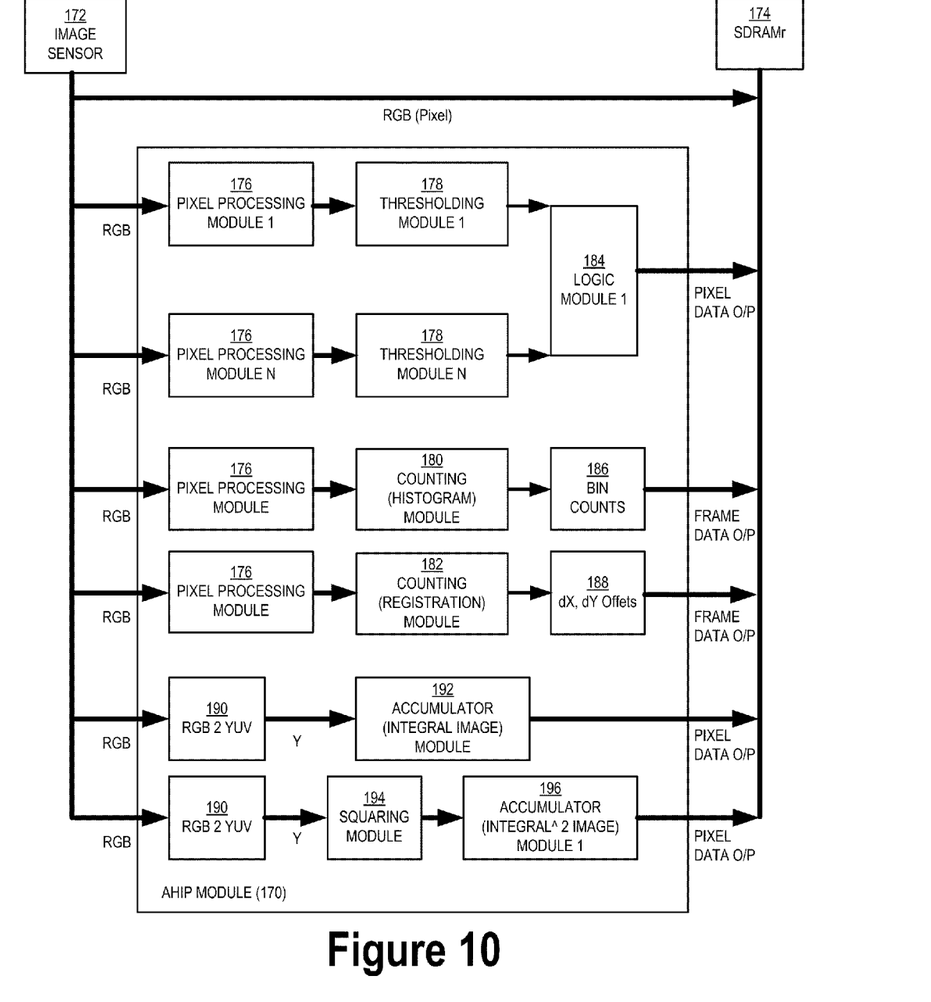
FIG. 10 illustrates an AHIP module in accordance with certain embodiments that outputs color space conversion, color thresholding, frame-to-frame registration, Integral Image and/or Integral Squared Image primitives and/or image frame histogram data.

FIG. 10 illustrates an AHIP module 170 that receives RGB data from an image sensor 172 and provides data to a memory 174, including pixel data and/or frame data. The example AHIP module 170 of FIG. 10 includes pixel processing modules 176. Two of the modules 176 feed thresholding modules 178 and two of the modules 176 feed counting modules, one histogram 180 and the other registration 182. A logic module 184 receives input from the thresholding modules 178 and outputs pixel data to memory 174. A bin counter 186 receives input from the counting (histogram) module 180 and outputs frame data to memory 174. A dX, dY offset block 188 receives input from the counting (registration) module 182 and outputs frame data to the memory 174. A first RGB-2-YUV block 190 outputs to an accumulator (integral image) module 192 which in turn outputs pixel data to memory 174. A second RGB-2-YUV block 190 outputs to a squaring module 194 and to an accumulator (integral squared image) module 196 which in turn outputs pixel data to memory 174.

Figure 11:
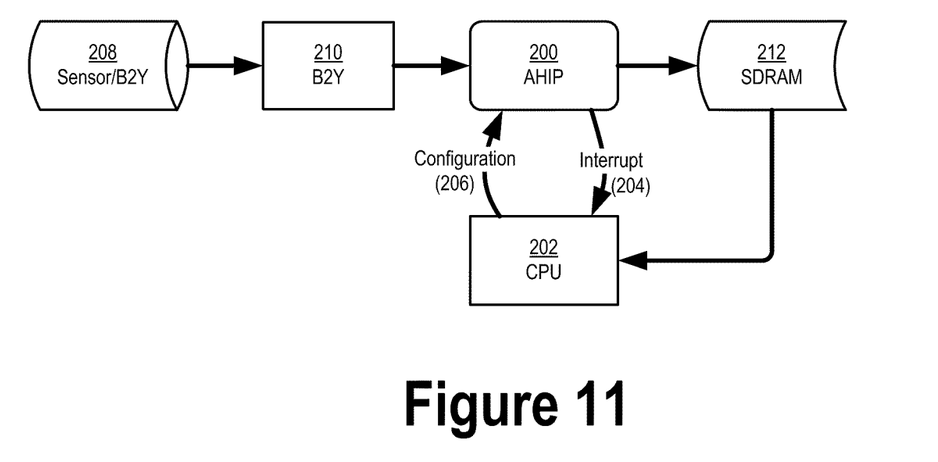
FIG. 11 illustrates processing relationships between an AHIP module and other image processing components in accordance with certain embodiments.

FIG. 11 illustrates an AHIP block 200 communicating with a CPU 202 including providing interrupts 204 to the CPU 202 and receiving configuration commands 206 from the CPU 202. The AHIP block 200 receives data from a sensor/B2Y 208 via a B2Y block 210 and outputs to memory 212.

Thresholding (THR)

This module contains four 8×1 LUTs for thresholding the outputs of other modules and converting them to binary values (1-bit). Multiple thresholding units can be incorporated within the AHIP.

Logic Function (LF)

This module contains a 6×6 LUT which can be used to further combine the results of the THR or other AHIP module such as the ColorMap module. It can implement 6 different logic functions with the inputs from the THR and SKIN modules. Multiple logic units can be incorporated within the AHIP.

Histograms (HIST)

Computes histograms may be applied to the original input data (YUV) and/or to the output of the CSC module. These modules accumulate a count value from each pixel and their output is available after each pixel of the image frame has been clocked through the AHIP. The number of histogram bins is typically 16 and the thresholds for each bin are programmable.

Integral Images Accumulators (II)

AKA Area Computation Modules

These modules contain blocks for computing integral images (allow for fast area computations in rectangular regions; see, e.g., U.S. Pat. No. 7,315,631, incorporated by reference above, and US 2002/0102024, incorporated by reference). They are usually employed in real-time object detection algorithms. There may be any of three standard blocks available:

II (summed area for original Y channel, used for area computation)

II2 (sum over Y square, used for variance computation)

Skin II (integral image on the skin map, gives the skin density in an area).

These modules may be used to accumulate their values on each input pixel and output the current accumulated value to provide the corresponding pixel value of the Integral Image, or Integral Variance or Skin Integral Image maps (see, e.g., US published application no. 2010/0053368, incorporated by reference).

Complex Downsampler (DS)

This downsampler scales the image for the other modules. The module was designed to provide a reasonable level of quality while having a low gate-count. It can be programmed to achieve variable downsizing of the main image.

Fixed Downsamplers (XDS)

A simpler downsampler implementation is also available using nearest neighbor interpollation. These allow simultaneous computations of maps at a fixed resolution. Typically ×2, ×4 and ×8 downsamplers will be available.

Workflow

AHIP may be designed to be integrated at the end of the image pipeline, after a De-Bayer module (sensor interface). While YUV is considered to be the native color space of AHIP, some internal modules can handle other color spaces as well. In addition to the sensor interface, AHIP provides a playback interface for reading data from memory. In preview mode, AHIP may be configured to handle data at the sensor clock rate (one clock per pixel). Data processed by AHIP may be written to a main memory of a target system (SDRAM). One or more of the modules may output values into registers. AHIP may or may not be configured to provide a streaming output interface to other modules.

An example of a typical workflow with AHIP is the following:

Live data from the sensor or from memory is sent to AHIP (one pixel at a time).

During the period of a frame, AHIP performs its computations:

One or more modules update internal statistics.

One or more other modules write data (maps) to the system memory. This may be typically done with minimal delay with respect to the input (i.e., data goes out as pixels come in).

After the end of a frame, AHIP triggers an interrupt to the CPU:

In normal conditions, the interrupt notifies the CPU that fresh data is available.

There may also be interrupts signalling error conditions.

The CPU interrupt handler is called:

It reads AHIP registers to find the reason of the interrupt.

It then optionally reconfigures AHIP (e.g., based on a determination that it would be advantageous to do so), and acknowledges the interrupt.

It also signals the other CPU threads that data from the hardware is available (and algorithms start using it).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments. The following are incorporated by reference: U.S. Pat. Nos. 7,715, 597, 7,702,136, 7,692,696, 7,684,630, 7,680,342, 7,676,108, 7,634,109, 7,630,527, 7,620,218, 7,606,417, 7,587,068, 7,403,643, 7,352,394, 6,407,777, 7,269,292, 7,308,156, 7,315,631, 7,336,821, 7,295,233, 6,571,003, 7,212,657, 7,039,222, 7,082,211, 7,184,578, 7,187,788, 6,639,685, 6,628,842, 6,256,058, 5,579,063, 6,480,300, 5,781,650, 7,362,368, 7,551,755, 7,515,740, 7,469,071 and 5,978,519; and U.S. published application nos. 2005/0041121, 2007/0110305, 2006/0204110, PCT/US2006/021393, 2005/0068452, 2006/0120599, 2006/0098890, 2006/0140455, 2006/0285754, 2008/0031498, 2007/0147820, 2007/0189748, 2008/0037840, 2007/0269108, 2007/0201724, 2002/0081003, 2003/0198384, 2006/0276698, 2004/0080631, 2008/0106615, 2006/0077261, 2007/0071347, 20060228040, 20060228039, 20060228038, 20060228037, 20060153470, 20040170337, 20030223622, 20090273685, 20080240555, 20080232711, 20090263022, 20080013798, 20070296833, 20080219517, 20080219518, 20080292193, 20080175481, 20080220750, 20080219581, 20080112599, 20080317379, 20080205712, 20090080797, 20090196466, 20090080713, 20090303343, 20090303342, 20090189998, 20090179998, 20090189998, 20090189997, 20090190803, 20100141787, 20100165150, 20100066822, 20100053368, and 20090179999; and U.S. patent application Ser. Nos. 61/361,868, 61/311,264, 60/829,127, 60/914,962, 61/019,370, 61/023,855, 61/221,467, 61/221,425, 61/221,417, 12/748,418, 61/182,625, 61/221,455, 12/479,658, 12/063,089, 61/120,289, 12/827,868, 12/824,204, 12/820,002, 12/784,418, 12/710,271, 12/636,647, 12/572,930, and 12/479,593.

What is claimed is:

1. An apparatus comprising one or more hardware processors, memory, and one or more modules configured to:
   process, in a dynamically reconfigurable heterogeneous systolic array, a first image frame to generate a plurality of image processing primitives from the first image frame;
   wherein the plurality of image processing primitives comprises at least one image map;
   store the plurality of image processing primitives and the first image frame in a memory store;
   based, at least in part, on the plurality of image processing primitives, determine one or more characteristics of the first image frame;
   based on the one or more characteristics determined for the first image frame, reconfigure the dynamically reconfigurable heterogeneous systolic array; and
   process, using the reconfigured dynamically reconfigurable heterogeneous systolic array, a second image frame based on the one or more characteristics.

2. The apparatus of claim 1, wherein an image processing primitive, of the plurality of image processing primitives, is generated by identifying a sub-region of the first image frame and generating the image processing primitive from m the sub-region.

3. The apparatus of claim 1,
   wherein the first image frame and the second image frame are video frames.

4. The apparatus of claim 1, wherein the plurality of image processing primitives comprises processed image maps or other processed hardware module data, or both.

5. The apparatus of claim 1, wherein the apparatus is also configured to provide formatted image data to a memory.

6. The apparatus of claim 4, wherein the processed image maps comprise threshold maps or integral image maps, or both.

7. The apparatus of claim 1, wherein the plurality of image processing primitives comprises regional primitives or frame data primitives, or both.

8. The apparatus of claim 1, wherein the apparatus is further configured to receive formatted image data from a memory.

9. The apparatus of claim 1, wherein the apparatus further comprises a transcode module configured to receive processed image data and to provide to or receive from a memory compressed image or video data, or both.

10. The apparatus of claim 9, wherein the transcode module is further configured to output selected subsets of the image data or video data, or both, to a display.

11. The apparatus of claim 1, wherein the apparatus is configured to process image data within a single clock cycle.

12. The apparatus of claim 1, wherein the apparatus is further configured to program a hardware module or an IPP module, or both.

13. An image acquisition and processing device comprising:
   a processor;
   a lens and image sensor for acquiring digital image frames;
   a dynamically reconfigurable heterogeneous systolic array configured to:
   process, in a dynamically reconfigurable heterogeneous systolic array, a first image frame to generate a plurality of image processing primitives from the first image frame;
   wherein an image processing primitive, of the plurality of image processing primitives, is generated by identifying a sub-region of the first image frame and generating the image processing primitive from the sub-region;
   wherein the plurality of image processing primitives comprises at least one image map;
   store the plurality of image processing primitives and the first image frame in a memory store;
   based, at least in part, on the plurality of image processing primitives, determine one or more characteristics of the first image frame;
   based on the one or more characteristics determined for the first image frame, reconfigure the dynamically reconfigurable heterogeneous systolic array; and
   process, using the reconfigured dynamically reconfigurable heterogeneous systolic array, a second image frame based on the one or more characteristics.

14. The device of claim 13, wherein an image processing primitive, of the plurality of image processing primitives, is generated by identifying a sub-region of the first image frame and generating the image processing primitive from the sub-region.

15. The device of claim 13,
   wherein the first image frame and the second image frame are video frames.

16. A method, comprising:
   processing, in a dynamically reconfigurable heterogeneous systolic array, a first image frame to generate a plurality of image processing primitives from the first image frame;
   wherein the plurality of image processing primitives comprises at least one image map;
   storing the plurality of image processing primitives and the first image frame in a memory store;
   based, at least in part, on the plurality of image processing primitives, determining one or more characteristics of the first image frame;
   based on the one or more characteristics determined for the first image frame, reconfiguring the dynamically reconfigurable heterogeneous systolic array; and processing, using the reconfigured dynamically reconfigurable heterogeneous systolic array, a second image frame based on the one or more characteristics;

wherein the method is performed using one or more computing devices.

17. The method of claim 16, wherein an image processing primitive, of the plurality of image processing primitives, is generated by identifying a sub-region of the first image frame and generating the image processing primitive from the sub-region.

18. The method of claim 16,
wherein the first image frame and the second image frame are video frames.

19. The method of claim 16, wherein the plurality of image processing primitives comprises processed image maps or other processed hardware module data, or both.

20. The method of claim 16, further comprising providing formatted image data to a memory from a hardware-based image processing module.

21. The method of claim 16, further comprising processing image maps, including threshold maps or integral image maps, or both.

22. The method of claim 16, wherein the plurality of image processing primitives comprises regional primitives or frame data primitives, or both.

23. The method of claim 16, further comprising receiving formatted image data from a memory.

24. The method of claim 16, further comprising transmitting processed image data to a transcode module and communicating compressed image or video data to or from the transcode module, or combinations thereof.

25. The method of claim 16, further comprising outputting selected subsets of image data or video data, or both, to a display.

26. The method of claim 16, further comprising processing image data within a single clock cycle with a hardware-based image processing module.

27. The method of claim 16, further comprising programming a hardware-based image processing module.

28. A non-transitory computer-readable storage medium storing one or more instructions which, when executed by one or more processors, cause the processors to perform:

processing in a dynamically reconfigurable heterogeneous systolic array, a first image frame to generate a plurality of image processing primitives from the first image frame;

wherein the plurality of image processing primitives comprises at least one image map;

storing the plurality of image processing primitives and the first image frame in a memory store;

based, at least in part, on the plurality of image processing primitives, determining one or more characteristics of the first image frame;

based on the one or more characteristics determined for the first image frame, reconfiguring the dynamically reconfigurable heterogeneous systolic array; and processing, using the reconfigured dynamically reconfigurable heterogeneous systolic array, a second image frame based on the one or more characteristics.

29. The non-transitory computer-readable storage medium of claim 28, wherein the plurality of image processing primitives comprises processed image maps or other processed hardware module data, or both.

30. The non-transitory computer-readable storage medium of claim 28 storing additional instructions which, when executed by the one or more processors, cause the processors to perform providing formatted image data to a memory.

31. The non-transitory computer-readable storage medium of claim 28, storing additional instructions which, when executed by the one or more processors, cause the processors to perform processing image maps including threshold maps or integral image maps, or both.

32. The non-transitory computer-readable storage medium of claim 28, wherein the plurality of image processing primitives comprises regional primitives or frame data primitives, or both.

33. The non-transitory computer-readable storage medium of claim 28, storing additional instructions which, when executed by the one or more processors, cause the processors to perform receiving and processing formatted image data from a memory.

34. The non-transitory computer-readable storage medium of claim 28, storing additional instructions which, when executed by the one or more processors, cause the processors to perform transmitting processed image data to a transcode module and communicating compressed image or video data to or from the transcode module, or combinations thereof.

35. The non-transitory computer-readable storage medium of claim 28, storing additional instructions which, when executed by the one or more processors, cause the processors to perform outputting selected subsets of image data or video data, or both, to a display.

36. The non-transitory computer-readable storage medium of claim 28, storing additional instructions which, when executed by the one or more processors, cause the processors to perform processing image data within a single clock cycle with a hardware-based image processing module.

37. The non-transitory computer-readable storage medium of claim 36, wherein the hardware-based image processing module is programmable.

* * * * *